Oct. 16, 1934.  W. H. PETIT ET AL  1,977,453
MEANS AND METHOD FOR PHOTOGRAPHING A LARGE SURFACE WITH SHORT FOCUS LENSES
Filed Jan. 25, 1933   9 Sheets-Sheet 1

INVENTORS
William H. Petit
BY Edson S. Hineline
Emery Booth Varney & Townsend
their ATTORNEYS

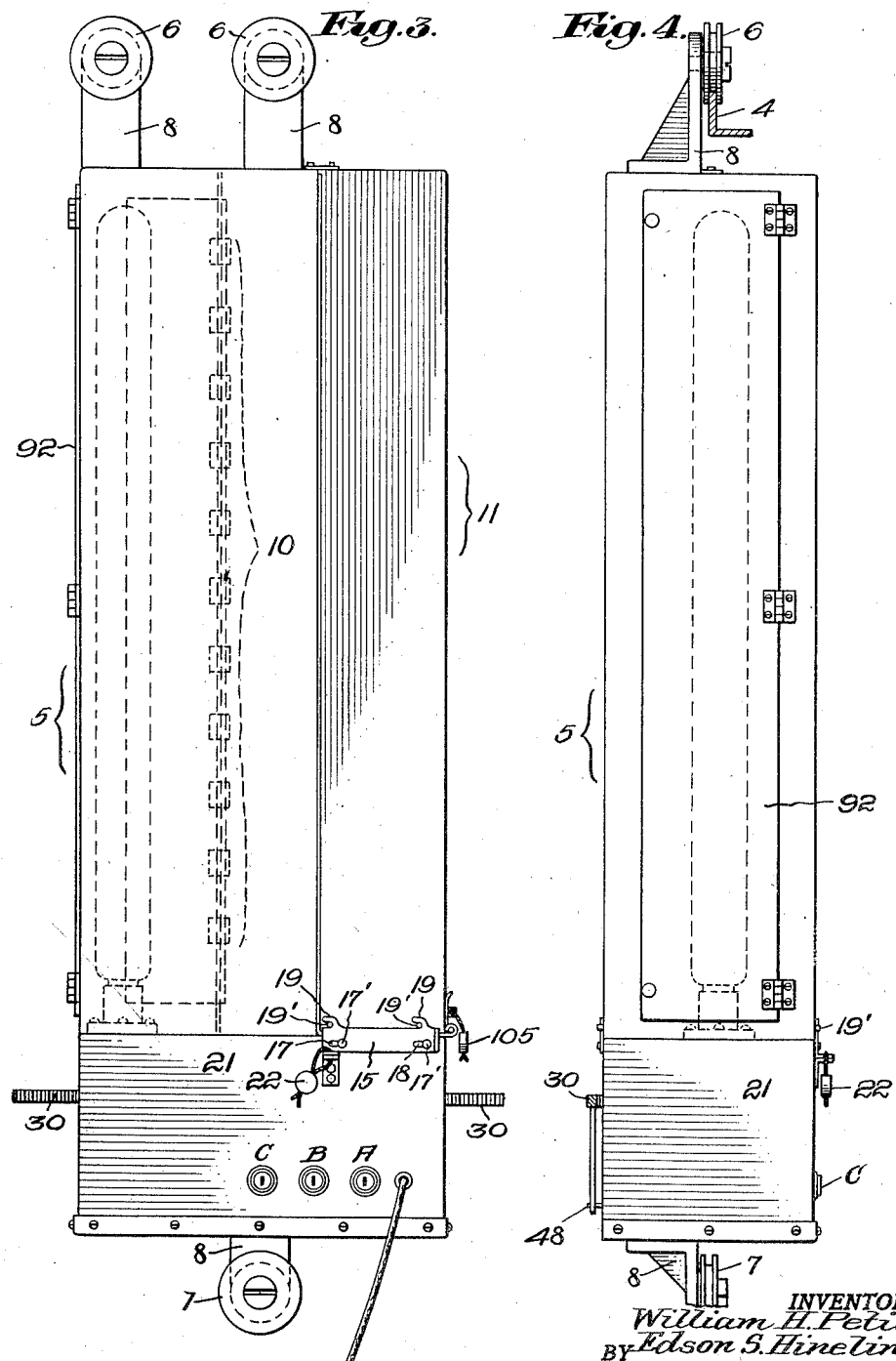

Oct. 16, 1934.  W. H. PETIT ET AL  1,977,453
MEANS AND METHOD FOR PHOTOGRAPHING A LARGE SURFACE WITH SHORT FOCUS LENSES
Filed Jan. 25, 1933   9 Sheets-Sheet 3
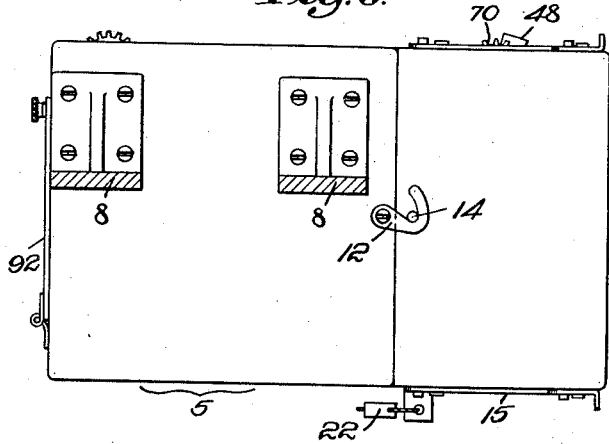
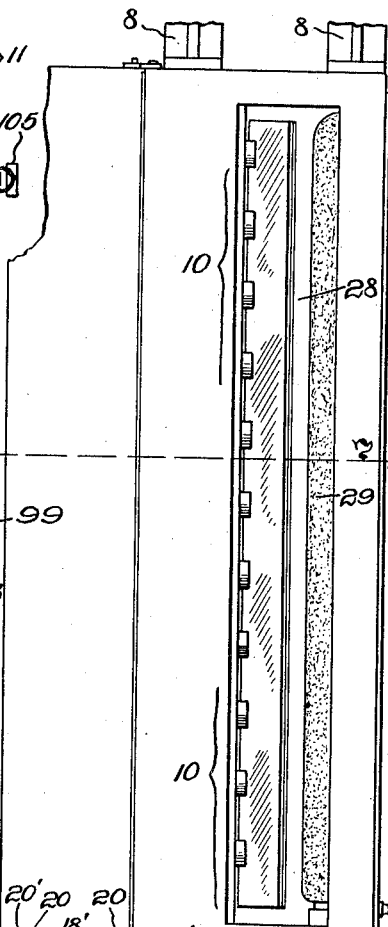
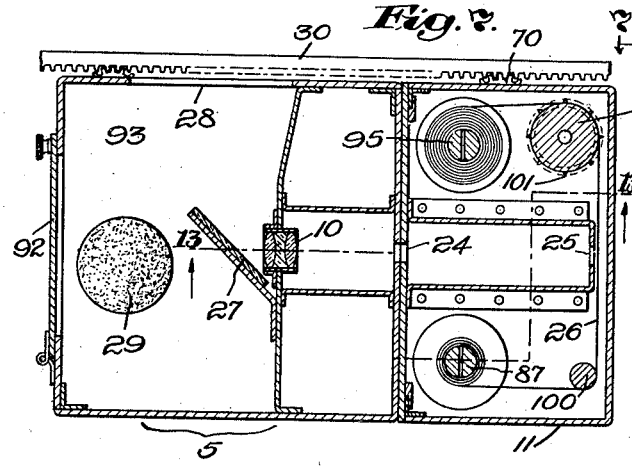
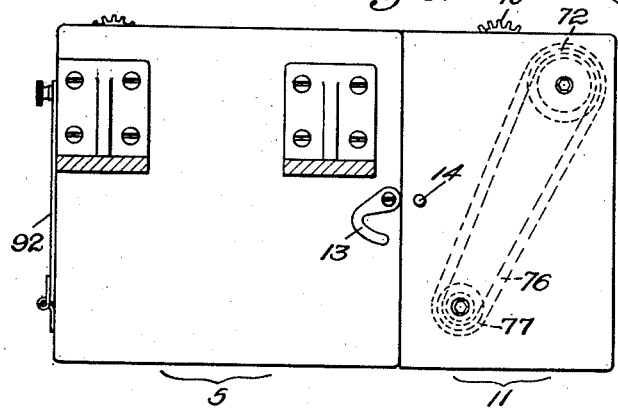
INVENTORS
William H. Petit
BY Edson S. Hineline
Emery, Booth, Varney & Townsend
their ATTORNEYS Oct. 16, 1934.   W. H. PETIT ET AL   1,977,453
MEANS AND METHOD FOR PHOTOGRAPHING A LARGE SURFACE WITH SHORT FOCUS LENSES
Filed Jan. 25, 1933   9 Sheets-Sheet 4
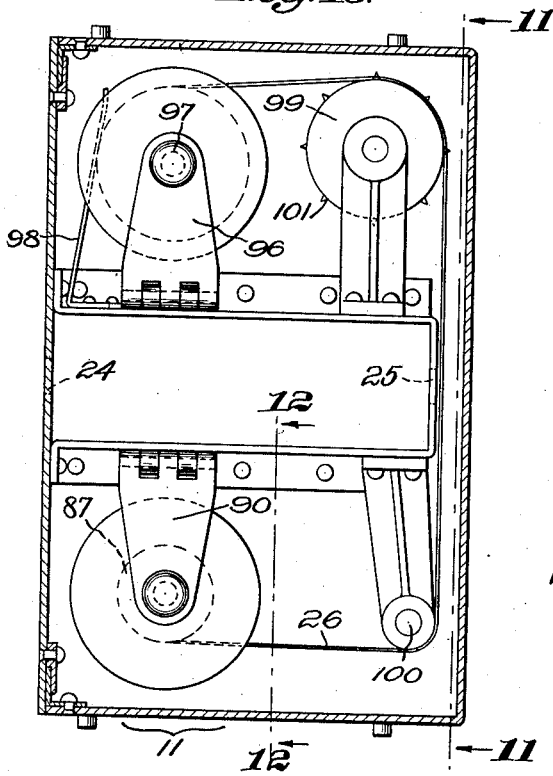
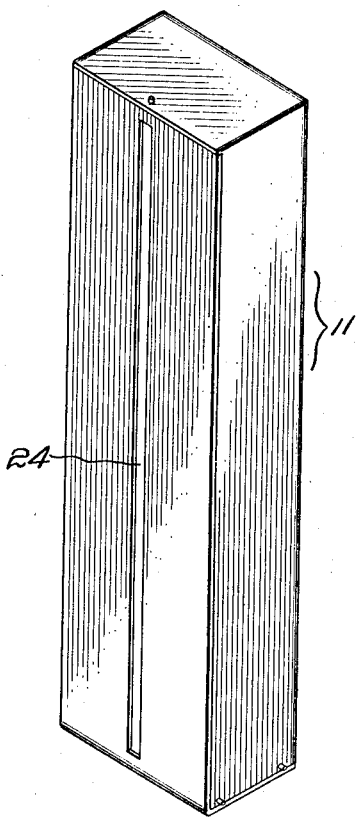
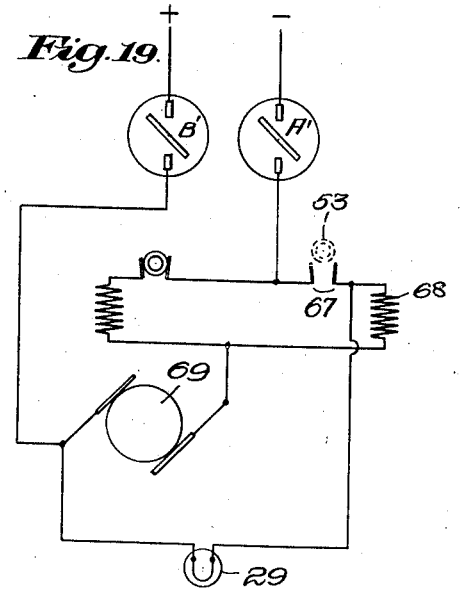
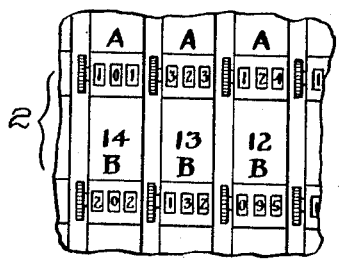
INVENTORS
William H. Petit
BY Edson S. Hineline
Emery Booth Varney & Townsend
their ATTORNEYS

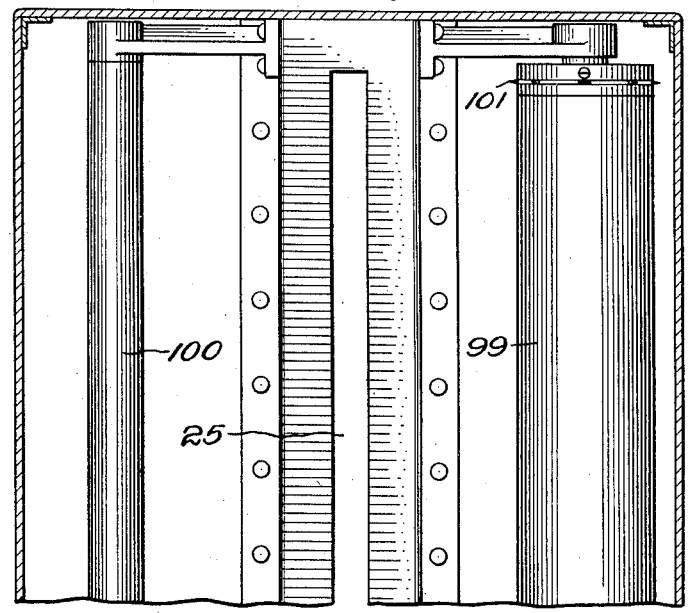
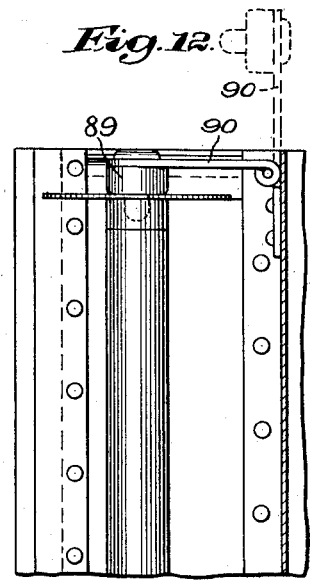
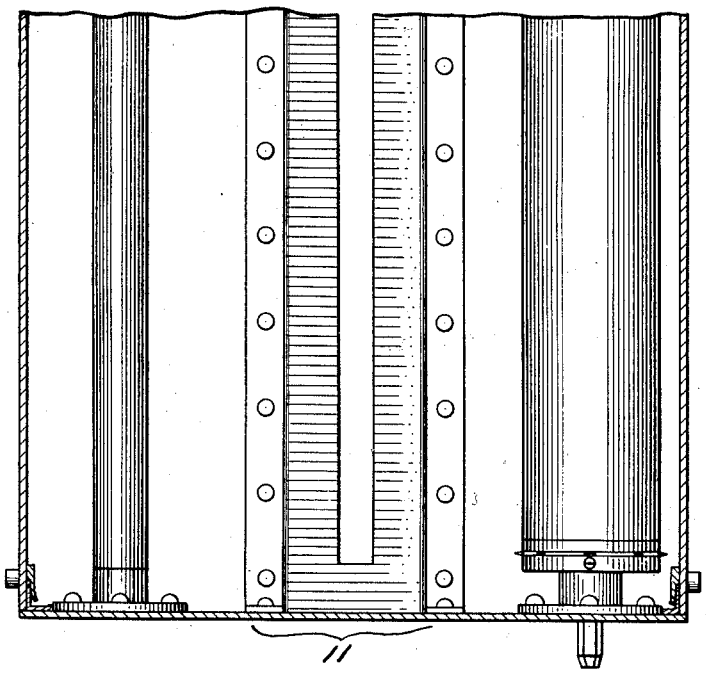

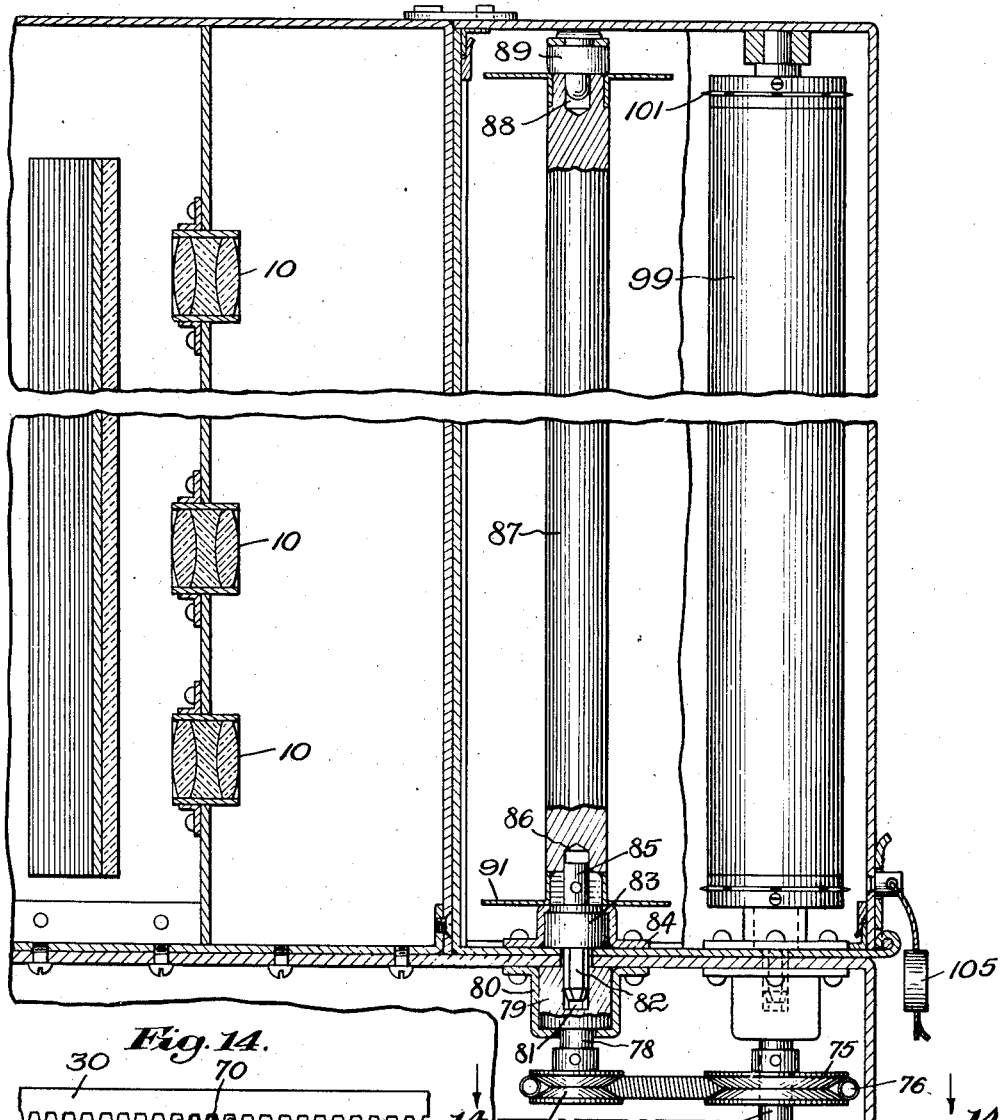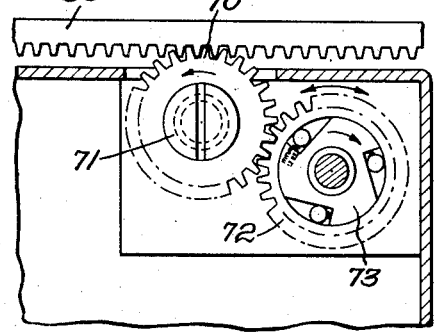

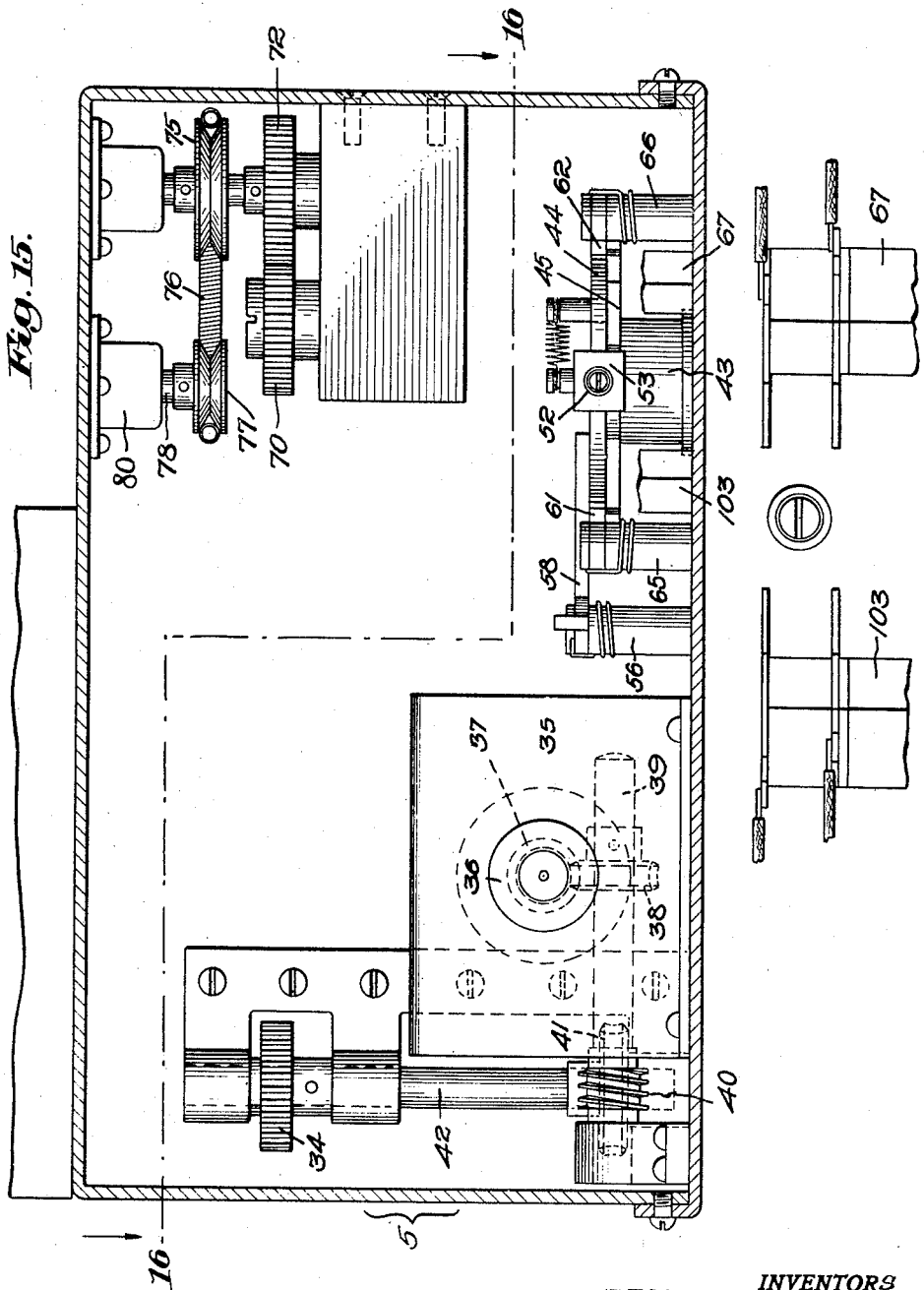

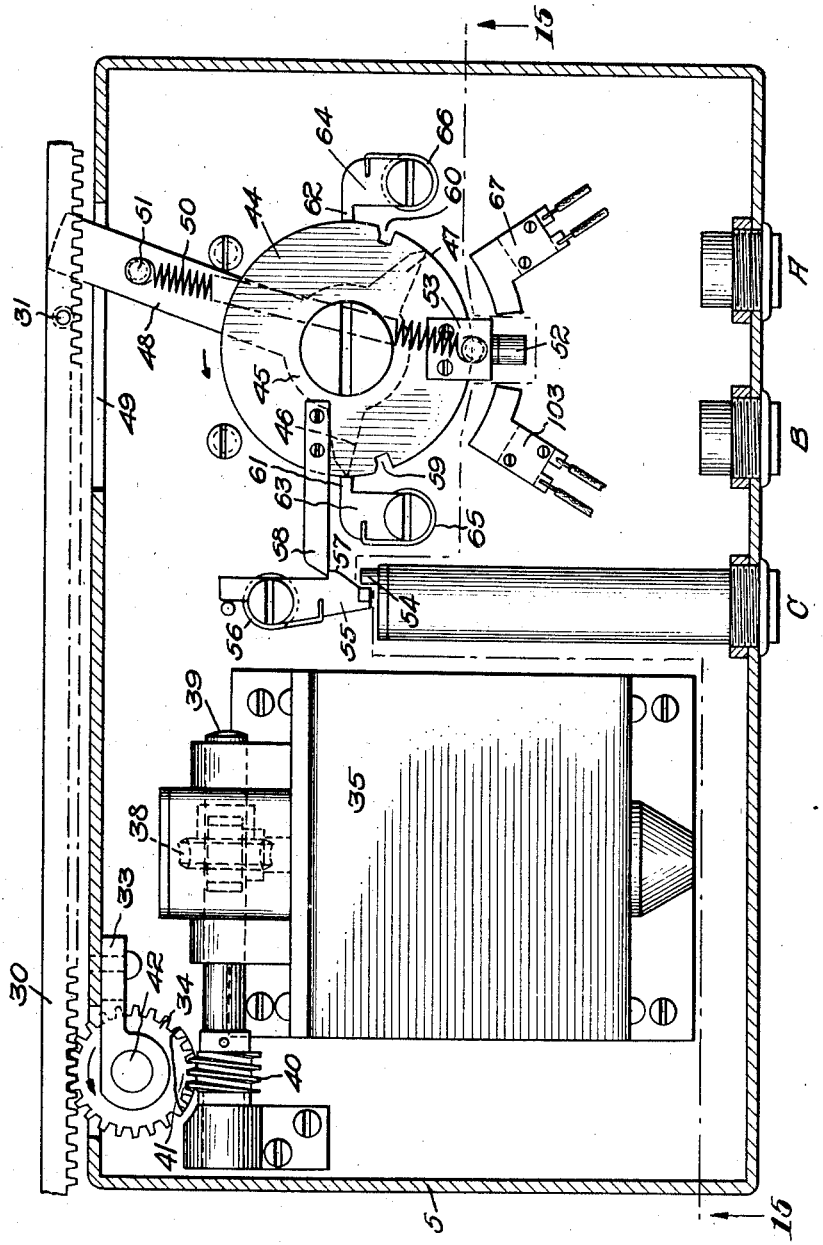

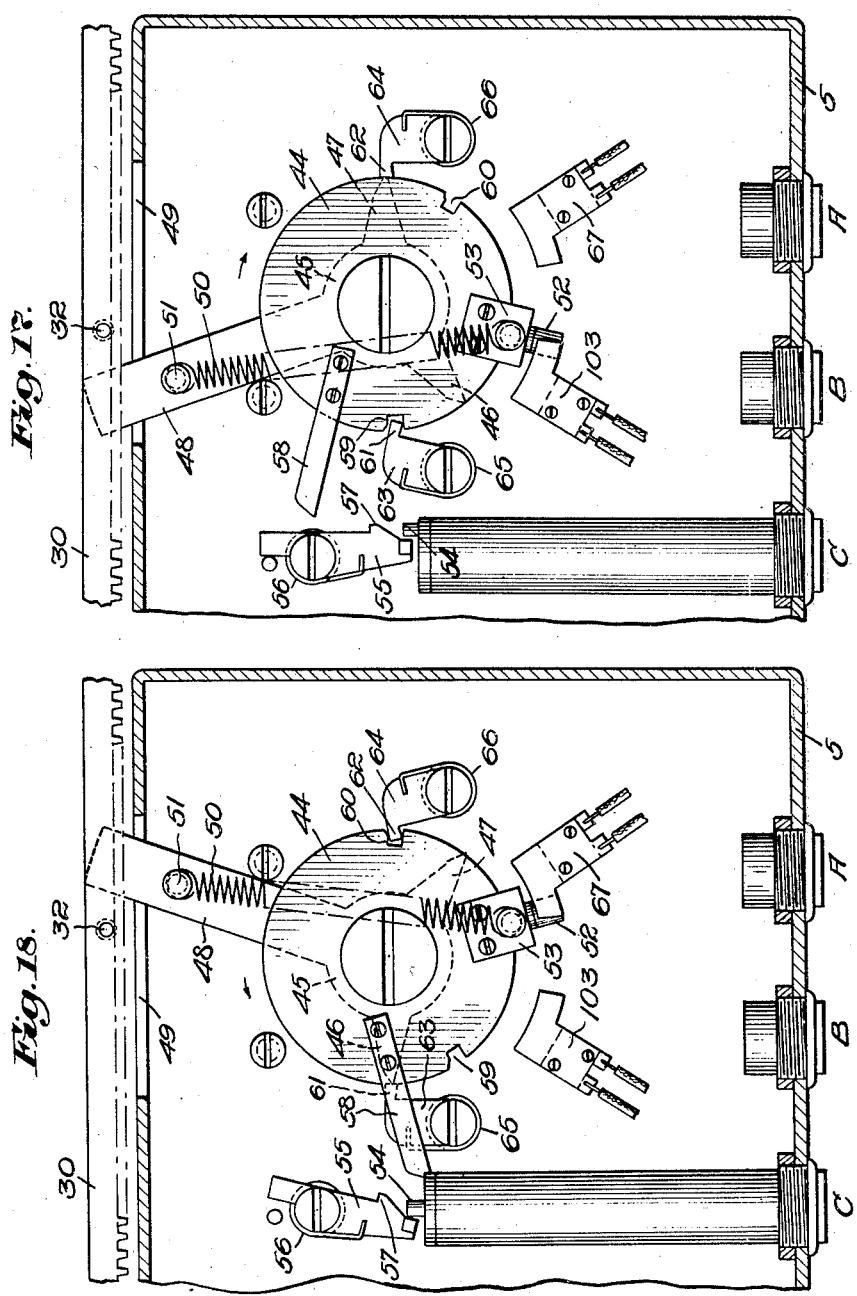

Patented Oct. 16, 1934

1,977,453

UNITED STATES PATENT OFFICE 1,977,453

MEANS AND METHOD FOR PHOTOGRAPHING A LARGE SURFACE WITH SHORT FOCUS LENSES

William H. Petit and Edson S. Hineline, Rochester, N. Y., assignors to Folmer Graflex Corporation, Rochester, N. Y., a corporation of Delaware Application January 25, 1933, Serial No. 653,426

46 Claims. (Cl. 88—24)

This invention relates to means and methods for taking photographs of relatively large surfaces by the use of very short focus lenses, the lenses being arranged in a bank or series so that the exposures through adjacent lenses blend at the margins of their respective exposure zones or areas, thus providing a complete picture of the entire surface, while supporting the photographing instrumentalities close to the surface that is being photographed. We have chosen to disclose herein that embodiment of our invention which comprises means for photographing the readings or parts of a voting machine before voting and after voting. It is evident, however, that our invention is susceptible of many different applications and uses.

In order that the principle of the invention may readily be understood, we have disclosed in the accompanying drawings a single embodiment of means for photographing a voting machine. In said drawings—

Fig. 3 is a rear elevation of the photographic apparatus including its magazine;

Fig. 4 is a side elevation of the structure shown in Fig. 3;

Fig. 5 is a front elevation of the structure shown in Fig. 3;

Fig. 6 is a top plan view thereof but with certain of the parts shown in transverse section;

Fig. 7 is a view in transverse section upon the line 7—7 of Fig. 5;

Fig. 8 is a bottom plan view thereof;

Fig. 9 is a perspective view of the magazine of the photographic apparatus;

Fig. 10 is a transverse section similar to the right hand side of Fig. 7 but upon a larger scale, the parts within the casing being shown in plan;

Fig. 11 is a view in vertical section with parts broken away, taken upon the vertical line 11—11 of Fig. 10;

Fig. 12 is a vertical section with parts broken away, taken upon the line 12—12 of Fig. 10;

Fig. 13 is a vertical section, with parts broken away, upon the irregular line 13—13 of Fig. 7;

Fig. 14 is a transverse section upon the line 14—14 of Fig. 13 and looking downward in that figure;

Fig. 15 is a vertical section of the lower part of the structure shown in Fig. 4 and looking from front to back in that figure, certain of the parts being omitted from the main portion of the view but shown enlarged at the right thereof;

Fig. 16 is a section upon the irregular line 16—16 of Fig. 15;

Fig. 17 represents a different operative position of the switch shown in Fig. 16;

Fig. 18 is a view similar to Fig. 17 but representing the parts in still another operative position;

Fig. 19 is a diagrammatic representation of the electric circuit employed; and

Fig. 20 is a detail in elevation of a small portion of the back of the voting machine to indicate the general character of the structure that is to be photographed by this embodiment of the invention.

A principal purpose of our invention is to photograph a relatively large sheet or surface distinctly and of such a size or scale that the figures or lettering or other indications upon the sheet or surface may be easily read without enlargement, while at the same time making the photographic exposure at a very short distance from the surface or sheet. This is highly desirable because it is frequently impossible owing to the crowded condition of a room or the small size thereof, to place the photographic apparatus at any great distance from the object or surface to be photographed.

In that embodiment of our invention herein disclosed (namely the photographing of the recording face of the voting machine) it is evident that these are generally used in places where it would be extremely difficult if not impossible to position the photographic apparatus at a substantial distance from the voting machine. Moreover if this could be done, the picture would be upon such a small scale that it would be necessary to make enlargements thereof for practical use.

In practising our invention we employ a bank or series of lenses and cause the same to traverse across the surface to be photographed. Each lens thus is functioning with respect to a single narrow transverse zone of the entire surface. The entire set or bank of lenses together photograph by their respective zones the entire surface or sheet and together produce by a single exposure a picture of the entire sheet or surface.

We do not in this application claim the broader method of photographically recording the actual vote-indications appearing upon voting machines, nor another mechanical embodiment disclosed and claimed in our copending application Serial No. 739,574, filed August 13, 1934, since both such broader method and said other mechanism are claimed in that application.

We will specifically describe that single embodiment of our invention, but without thereby limiting the invention to the single use illustrated.

Figure 1:
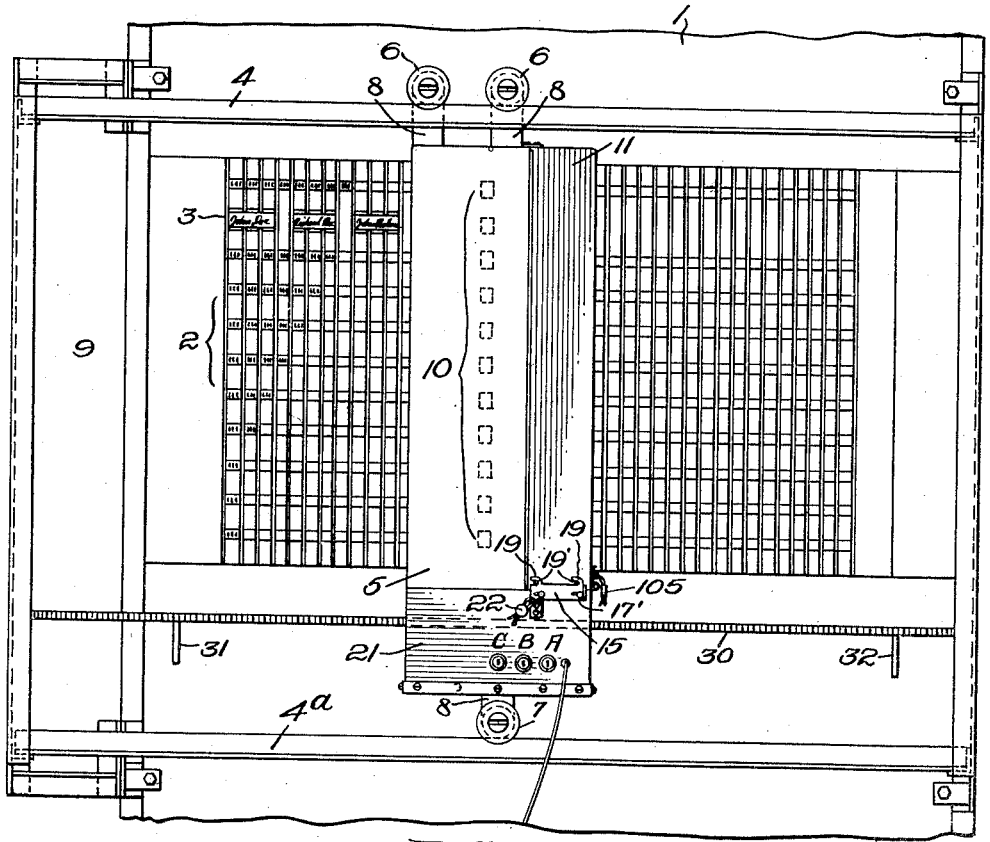
Fig. 1 is an elevation of a part of the back of a voting machine having the photographic mechanism of our invention applied thereto.

Referring first to Fig. 1 the back of the voting machine is indicated at 1. Upon the back are a series of readings generally indicated at 2 in Fig. 1 and also in detail in Fig. 20. The readings consist of numerals upon the peripheries of sets of disks, each set of disks indicating the total number of votes for one person or matter. Preferably we provide means whereby the inspectors of elections may write their names at some point at the back of the voting machine, and at 3 in Fig. 1 we have indicated the names of three inspectors. This is intended as a safeguard, and it is pointed out that when the photographs are taken, they are in a sealed receptacle and are delivered in such sealed receptacle to some suitable place for development. Prior to the development of the pictures of all the voting machines of a city or locality it would not be known to which voting machines the respective films pertain. This would eliminate one opportunity for fraud.

Upon the back of the voting machine we position an upper and a lower track 4, 4a, and the photographic apparatus which is indicated generally at 5 in the several figures is provided with two upper rolls 6, 6 and a lower roll 7, all suitably carried by brackets or members 8, 8, 8, shown most clearly in Fig. 1.

The voting machine should be provided with a lateral extension 9 in front of which the tracks 4, 5 extend, the purpose being to afford means to support the photographic apparatus at one side of the voting machine and thus to leave all of the back of the said machine open to inspection.

The photographic apparatus itself may be of various shapes and sizes according to the size or shape of the sheet or surface that is to be photographed. We have herein represented the same as of a general upright oblong shape, the height or length thereof being somewhat in excess of the height of that part of the back of the voting machine having all the readings of the voting.

Referring to Fig. 1, it will be observed that there are eleven sets of readings in each vertical tier. We accordingly provide eleven lenses indicated at 10 in the several figures, each lens being so positioned as to take care of all the readings which are at the same level entirely across the back of the voting machine. Thus, with eleven sets of readings in each vertical tier respectively indicated at A, A, A in Fig. 20, there are provided eleven lenses 10. This number will, of course, be varied or changed to suit other conditions or other sheets or surfaces to be photographed. So far as we are aware, we are the first to photograph at very close quarters a relatively large surface by employing a series of lenses, all for making a single picture. In the disclosed embodiment of the invention, the photographic apparatus is in motion across the back of the voting machine while the exposure is being made, and so far as we are aware we are the first to provide a series of lenses cooperating in the photographing of a surface by a single exposure while using a series of lenses.

While the shape and size of the photographic apparatus are determined by the particular requirements of the case, it is an important feature of our invention to provide a magazine which may be sealed against tampering, said magazine containing the sensitized surface or film and suitable supporting means therefor. Such magazine may be removed in its sealed condition from the camera or photographic apparatus, and transmitted to the place where the sensitive surface or film is to be developed.

While the magazine or sealed receptacle may be variously constructed, we have in several figures indicated the same generally at 11. Viewing Fig. 3, which is a side elevation, Fig. 6, which is a plan, and the other views showing the magazine or sealed receptacle, it will be evident that the top of the body portion 5 of the photographic apparatus is provided with a hook 12 and the bottom is provided with a hook 13 for engagement with pins 14. Also, as evident from Figs. 3 and 5, there are provided near the lower end of the magazine two opposite slides 15, 16, having slots 17, 18 receiving pins 17', 18' permitting the said slides to be moved to engage or disengage by their ears 19, 20 the pins 19', 20' which are on the side and back of the magazine. The slides 15, 16 are themselves supported by the pins 17', 18' and their slots, upon the lower or base portion 21 of the photographic apparatus, and seals are provided one of which is indicated at 22, to secure the slides in position thus locking the magazine to the camera or body portion 5 thereof. In order to remove the magazine it is necessary to destroy or break the seals 22 for the two slides 15, 16 so as thereby to release the slides 15, 16, and this is done only by authorized persons.

We do not in this application claim the sealed package containing the photographic elements or part shown because the same is claimed in a separate application, Ser. No. 669,508.

Such sealed package is capable of use in many different relations and the same is shown here only as a part of a photographic organization designed to be used in making records of the readings of a voting machine.

The magazine itself is indicated separated from the body of the photographic apparatus in Fig. 9. It will be observed that in this embodiment of the sealed package there exists an entirely closed receptacle having the described pins by which the magazine is held or secured in position for use. The receptacle is also provided with a lengthwise slit 24 indicated also in section in Fig. 7 and through which and the similar slit 25 the image or picture is transmitted to the film indicated at 26. In said Fig. 7 one of the lenses is indicated at 10 and in the rear thereof is the inclined mirror 27. The image is transmitted to the mirror 27 through the relatively wide vertical opening 28 in the wall of the camera body 5, the said opening 28 being indicated upon a larger scale in Fig. 5. In the rear of the mirror 27 is positioned the light 29 which is preferably a long bulb of the entire height of the photographic apparatus or at least so much of the height as is comprehended by the entire bank or step of lenses 10.

It is to be understood that in the disclosed embodiment of my invention the picture or exposure is to be made while the camera or photographic apparatus 5 is traveling across the back of the voting machine. This is accomplished by moving the photographic film at the same rate at which the receptacle or apparatus 5 travels, thus providing relatively stationary parts.

So far as the disclosed embodiment or use of our invention is concerned, it is necessary to photograph the voting machine (in this case, the back thereof) before the voting begins and to photograph the same again after the voting is ended. Thus a comparison may be made of the two impressions or pictures and the difference in the readings of the different units or steps in the two pictures would be the total votes.

If no photograph were taken of the voting machine before the voting began, it is evident that fraud could be perpetrated by turning the readings at some of the disks in such a way as to cause a misrepresentation of the total vote of some candidate or candidates. For example, a fraudulent result might be indicated in the following manner.

Viewing Fig. 20, it will be evident that the three disks indicate units, tens and hundreds, and that first the unit disk and then the tens disk and then the hundred disk are turned until 999 are indicated, whereupon the readings begin again at 1 on the unit disk. If the disks of one set be turned prior to the voting so as to indicate 925, and this fact be not known, it is evident that as soon as that candidate has received 75 votes, his set of disks immediately begins to record again at 1, whereas the other candidates who may be assumed to be receiving substantially as many votes would have a record of 75 votes. In other words, one of the candidates has been handicapped to the extent of 75 votes.

All this is avoided by making the photographic reading of all the voting indications or disks of the voting machine before the voting begins, and again photographing the same field or surface after the voting ends and then making a comparison of the two photographs.

In the practice or operation of this embodiment of our invention the photographic apparatus 5 will be first positioned at the extreme left side of the back of the voting machine viewing Fig. 1, that is, directly in front of the extension 9 so that all of the counting or indicating disks 2 are exposed to view.

The photographic apparatus 5 is provided with means (preferably an electric motor) by which it is automatically moved across the back of the voting machine, taking the picture of the back of the voting machine during the travel of the photographic apparatus 5, which at the end of its travel toward the right viewing Fig. 1 will automatically reverse its direction of travel and return to its initial position at the extreme left of Fig. 1, during which reverse travel no picture will be taken, as will be explained. This will, when the film is developed, give a photographic reproduction of the back of the voting machine before the voting begins. At the close of voting this same operation is repeated so that a picture is made of the back of the voting machine at the termination of voting.

In order that the photographic apparatus 5 may not be moved from its position of rest at the extreme left of Fig. 1 until started by authorized persons, such as the supervisors of elections, we have provided the following structure or mechanism as one embodiment only of means for controlling the travel of the photographic apparatus 5.

Viewing Figs. 1, 3 and 16, 17, 18, it will be observed that there are three apertures or key holes A, B, C. The keys for these three different apertures must differ among themselves to ensure the utmost safeguarding. They are intended to be in the sole custody of three different election inspectors or officials, of, say, the three leading parties. It is necessary therefore for the three keys to be inserted and turned before the motor can begin to run or function.

Referring briefly to Fig. 19, where the electric circuit is diagrammatically indicated, it will be seen that the two keys A, B, when turned, turn the switches A', B' shown in Fig. 19 so as to complete the circuit. The photographic apparatus 5, however, cannot begin its travel from left to right viewing Fig. 1 until the third key is inserted in the key hole C, inasmuch as an operating cam or member having an arm that protrudes through an opening in the side of the sealed magazine or receptacle cannot be moved to pass a starting pin, as will now be explained.

Referring to Fig. 1 and to Fig. 16, it will be noted that there is a rack 30 mounted or supported across the back of the voting machine below all the indicating or counting disks 2, and preferably spaced only a few inches therefrom. The said rack 30 is provided with a starting pin 31 and a reversing pin 32.

The film and its let-off and take-up rolls are mounted in the sealed magazine or receptacle 11 which is to be opened only by an authorized person, but the electric motor and its gearing are mounted in the basal portion of the apparatus 5, but so as to feed the film into the sealed magazine 11. Viewing Fig. 16, it will be noted that a bracket 33 is secured to the inside of the basal part of the apparatus 5 and has a bearing upon which is mounted a small pinion 34 meshing with the teeth of the rack 30. Assuming that the photographic apparatus 5 is initially positioned at the extreme left of Fig. 1, so that said apparatus is about to travel to the right across the back of the voting machine,—if the pinion 34 be rotated contra-clockwise as indicated by the arrow in Fig. 16, the result will be to traverse the said photographic apparatus 5 toward the right viewing Figs. 1 and 16, along the rack 30. In order to rotate the pinion 34 in the direction stated (and in the reverse direction when the motor is reversed), the motor, which is merely diagrammatically indicated at 35 in the several figures, is provided with a drive shaft 36, a worm 37 whereon meshes with a worm wheel 38 upon a worm shaft 39 carrying at its opposite end a worm 40 meshing with a worm wheel 41 upon an upright shaft 42 whereon is fast the said pinion 34.

The controlling or governing means for the travel of the photographic apparatus 5 is represented in neutral position in Fig. 16; is represented in its position of forward travel of the apparatus 5 in Fig. 18; and is represented in the position for reverse travel of the apparatus 5 in Fig. 17.

Viewing Figs. 16 and 18 it will be noted that upon a stud 43 in the basal portion of the apparatus 5 there is loosely mounted a so-called floating disk 44 co-axial with which but free to move relative thereto, is an operating cam member 45 having two radial projections 46, 47 and an arm 48 extending out through a slot 49 in the wall of the basal part of the apparatus 5. The said arm 48 occupies, when the camera is positioned at the extreme left in Fig. 1, the position shown in Fig. 16, inasmuch as when the photographic apparatus 5 was last previously used, or in placing the same in position for use, the same arm 48 contacted with the pin 31 on the rack 30 and was thereby moved into its position to the right of the center of said floating disk 44, from its previous position to the left of the center of said disk, as shown in Fig. 17. In such position of the arm 48 a coil spring 50 connected at one end to a pin 51 on the arm 48 and at its other end to a pin 52 on a block or switch 53 upon the floating disk 44, being thus positioned past the center of the floating disk, acts or tends to move the said arm 48 as well as the cam 45 and the floating disk 44 from the neutral position shown in Fig. 16 to the forward driving position shown in Fig. 18. This, however, cannot take place until the third key has been inserted in the third keyhole C.

Viewing Fig. 16, which is the neutral position, it will be noted that the barrel or member which is turned by the key inserted in keyhole C, has a projection 54 which, when the barrel or member is turned by the key, moves into the position shown in Fig. 18, thus swinging a latch or detent 55 clockwise viewing Figs. 16 and 18. The said detent 55 is provided with a spring 56 coiled about its pivot and tending normally therefore to hold the said detent toward the right viewing Figs. 16 and 18. The said detent is provided with a shoulder 57 which, as shown in Fig. 16, takes under the end of a rigid arm 58 secured to and extending laterally from a face of the floating disk 44. The turning of said detent 55 in a clockwise direction releases the arm 58 and therefore permits the coiled spring 50, (which, as stated, is connected at its lower end to the floating disk 44) to pull or draw said floating disk slightly in a contraclockwise direction so as to bring it from the neutral position shown in Fig. 15 to the forward driving position shown in Fig. 18.

The said floating disk 44 is provided with two peripheral notches 59, 60 adapted to be entered by the ends 61, 62 of two detents 63, 64 pivoted upon the wall of the basal part of the apparatus 5 and provided with coiled spring 65, 66, tending to move said detent inwardly.

The movement of the arm 48 of the cam 45 into the position shown in Fig. 16 for the commencement of the operation, causes the radial projection 46 of the cam 45 to engage the nose 61 of the detent 63 and thus crowd it out of the peripheral notch 59 of the floating disk 44. This leaves the said floating disk 44 free to be turned slightly circumferentially by the upward pull of the spring 50 as already described, inasmuch as at this time the nose 62 of the detent 64 is not in the notch 60 but is in the position shown in Fig. 17.

The upward pull of the coiled spring 50 not only turns the floating disk 44 slightly in a contraclockwise direction but in doing so brings the block or switch 53 into the position shown in Fig. 18, thereby causing said block or switch 53 to bridge or close the gap 67 in the circuit indicated in Fig. 19.

By thus completing the circuit (the keys for the keyholes A and B, having already been used to turn the parts A', B' from their neutral position shown in Fig. 19), the circuit is established through the forward field 68 of the motor, and the armature 69, as well as the electric light 29, so that the motor being forwardly driven moves the photographic apparatus 5 including the sealed receptacle 11 from its position of rest at the left hand side of the voting machine viewing Fig. 1, toward the right hand side thereof. It has been stated that the electric light or lamp 29 is energized by the forward driving of the motor. The photographic apparatus is preferably not provided with a shutter and therefore a continuous exposure is made during the entire travel of the photographic apparatus 5 across the back of the voting machine when traveling toward the right viewing Fig. 1.

It is therefore necessary to provide means to feed the film past an exposure opening therefor at precisely the same speed at which the photographic apparatus travels across the back of the voting machine. While this may be accomplished in many different ways, we have for this embodiment of the invention shown the following means.

As shown most clearly in Figs. 7, 8, 13 and 14, there is mounted inside the basal portion of the apparatus 5 a small pinion 70 which meshes with the rack 30 and is of the same diameter and number of teeth as the pinion 34 shown in Fig. 16 and elsewhere. The said pinion 70 is mounted upon a stud 71 and meshes with a pinion 72 of equal diameter, which as most clearly shown in Figs. 13 and 14, is provided with a forward ball clutch drive 73. As shown most clearly in Fig. 13, the shaft or spindle 74, whereon is the pinion 72, has fast thereon a small pulley 75 to receive a driving band or belt 76, preferably of coiled wire which will permit slippage if necessary. Said band 76 extends about another pulley 77 as shown in Fig. 13. The said pulley 77 is fast upon a stud shaft 78 having a head or enlargement 79 received or supported within a cap or enclosure 80 secured to the outside of the wall of the basal portion of the apparatus 5. Said head 79 is provided with an axial socket 81 polygonally shaped or splined to receive a similarly shaped axial extension 82 of a stud whose head is shown at 83. The head 83 is itself mounted within a cap or enclosure 84 secured to the inner side of the sealed magazine or receptacle 11. Said stud has upwardly extending from its head a pin 85 which is located to enter the socket 86 in the lower end of the take-up spool 87 which at its upper end, as shown most clearly in Figs. 10 and 13, is provided with a flange 87 and an axial socket 88 to receive a pin 89 supported by the pivoted bracket or member 90, shown in open position in dotted lines in Fig. 12. Said take-up spool is also provided with a flange 91 at its lower end.

This or any other suitable construction may be provided to constitute the take-up spool or member onto which the film 26 is constantly wound during the travel of the photographic apparatus 5 as described, said film being best shown in Fig. 7.

The upright portion of the photographic apparatus 5, and which contains the lamp 29, mirror 27 and the bank of lenses 10, is provided with a door 92 shown most clearly in Figs. 4 and 7, which is suitably equipped to prevent the admission of light into the chamber 93 of the said apparatus 5.

It will be understood that the sealed receptacle 11 may by the properly authorized person be removed from the basal portion of the apparatus 5, the driving connection shown in Fig. 13 being readily separable.

The film 26 is a sensitized film of any suitable character and provided as a sealed roll to be positioned as the let-off roll. As shown in section at 95 in Fig. 7, the said let-off roll is suitably supported at its ends, the supporting means at the upper end thereof being shown in Fig. 10 as a pivoted arm 96 having a stud 97 to engage a suitable axial socket in the spool of the roll. We provide a spring 98 to bear upon the film as it is drawn or let off during the travel of the camera.

The film is positioned in any suitable manner, as by unsealing the end of the film roll, then placing the roll in position as indicated at 95 in Fig. 7, then drawing the leading end of the film about the measuring roll 99, then about the guide roll 100 and then securing the leading end of the film to the take-up roll 87 which, as described, is the driven roll of the film feeding mechanism.

The measuring roll 99 is provided with spurs 101 to engage suitable marginal openings in the film and thereby insure the positive feeding of the film. Within the sealed magazine or receptacle 11 there may be provided a suitable wall 102 shown in Fig. 7 as of general U shape in transverse section, said wall having the opening 25 across which the film is fed at precisely the same rate of speed as the travel of the photographic apparatus 5 past the back of the voting machine.

Due to such fact of equalities of speeds a continuous exposure is made through the opening 28, the image being reflected by the mirror 27 through the entire bank of lenses 10 onto the film 26, which thus receives the impression of the entire back of the voting machine.

In this embodiment of the invention no shutter is employed since the lamp or electric light 29 is functioning only during the forward direction of travel of the voting apparatus (that is, toward the right in Fig. 1), and moreover, there is no feeding movement of the film during the return travel of the photographic apparatus 5 to the left viewing Fig. 1. The current passes through the lamp 29 when the motor is forwardly driven, but during the reverse driving of the motor the lamp 29 would be but very dimly functioning if at all, and if no shutter be employed there would at the most be merely a dark vertical line in the exposed film at the end of the first exposure.

Within the scope or purpose of the invention, we may provide a shutter which is automatically opened at the precise instant of the commencement of the travel of the voting machine from left to right viewing Fig. 1 and which is held open until the travel toward the right is completed, when the shutter is automatically closed and remains closed until another exposure is desired.

When the photographic apparatus 5 reaches the limit of its travel towards the right viewing Fig. 1, the arm 48 strikes the reversing pin 32 and moves the arm 48 into the position shown in Fig. 17, changing it from the position shown in Fig. 18 in which position of Fig. 18 it was held locked by the detent 64 engaging the notch 60. The shifting of the arm 48 to the position shown in Fig. 17 brings the coiled spring 50 to a position at the left of the pivot of the floating disk 44. The result is that the upward pull of the spring 50 in its new position tends to pull the switch or block 53 into the position shown in Fig. 17 so as to close or bridge the gap at 103. The shifting of the arm 48 into the position shown in Fig. 17 causes the radial projection 47 of the arm 45 to engage the detent 64 and push the same out of the notch 60. This permits the spring 50 to function as described and by its upward pull to move the floating disk 44 into the position shown in Fig. 17, at which time the detent 63 instantly enters the notch 59 and holds the floating disk in its new position. This position is maintained throughout the return movement of the photographic apparatus 5 to the extreme left viewing Fig. 1.

It will be understood from the foregoing description of the construction and operation, that the film is at all times during the taking of the pictures sealed within the magazine or receptacle 11, (but is driven from the motor within the basal part of the apparatus 5). This is done through a third slide 104 indicated in Figs. 3 and 5 as at the front of the receptacle or magazine 11. The said slide or latch is sealed by a seal 105 which is to be broken only by an authorized person, for removing the film after both exposures have been made and the development thereof.

Figure 2:
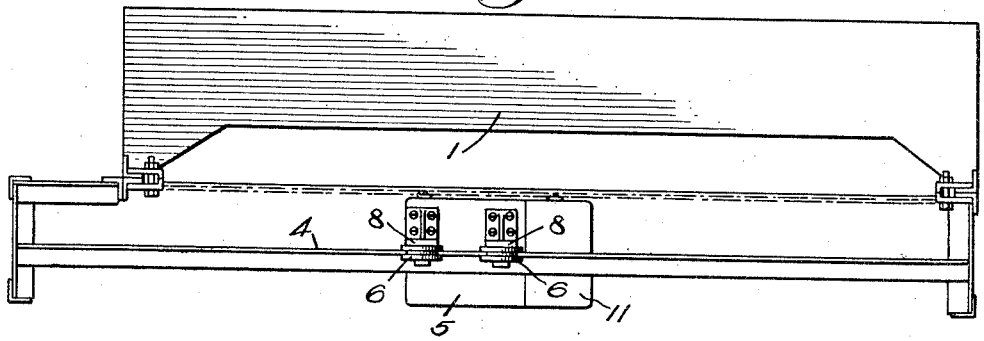
Fig. 2 is a plan view of the structure shown in Fig. 1.

Although we have specifically described the application to a voting machine of our broad or generic invention, it is to be understood that this is one only of the uses to which our invention is adapted. So far as we are aware, we are the first to provide means including a battery of lenses whereby a sheet or surface of considerable size may be photographed at a very short range, as for example but a few inches, which is the case in the disclosed example or embodiment of the invention, as will be clear from an inspection of Figs. 1 and 2. Other broad features of the invention are set forth in the claims.

Having thus described one illustrative embodiment of the apparatus of our invention and the best mode known to us for carrying out the method of our invention, it is to be understood that although specific terms are employed, they are used in a generic and descriptive sense and not for purposes of limitation, the scope of the invention being set forth in the following claims.

We claim:

1. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, means relatively to traverse said object-surface and said photographic apparatus, and means for effecting exposure of the sensitive surface during said relative traversing movement.

2. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, means relatively to traverse said object-surface and said photographic apparatus, means to support a sensitive film carried by said photographic apparatus, and means to feed said film at the same rate as the said traversing movement, whereby a picture is uninterruptedly taken of the object-surface during said traversing movement.

3. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, means to traverse said photographic apparatus across said object-surface, and means for effecting exposure of the sensitive surface during said traverse of the said apparatus.

4. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, a motor carried by said apparatus to traverse the latter across said object-surface, and means to feed the sensitive surface of the apparatus past an exposure opening at the same rate as the traversing movement of said apparatus.

5. Mechanism for photographing a relatively large object-surface close to the sensitive surface of the photographic apparatus, comprising in combination, a photographic apparatus having a series or bank of lenses positioned so that each lens functions with respect to a single transverse zone of the surface to be photographed, said lenses collectively functioning with respect to the entire object-surface by blending their zones, a motor carried by said apparatus to traverse the latter across said object-surface, means automatically to reverse said motor at the end of the said traversing movement, whereby the photographic apparatus is returned across said object-surface, and means for effecting exposure of the sensitive surface during the forward traversing movement of said apparatus.

6. Mechanism for photographing a relatively large object-surface close to the sensitive surface of the photographic apparatus, comprising in combination, a photographic apparatus having a series or bank of lenses positioned so that each lens functions with respect to a single transverse zone of the surface to be photographed, said lenses collectively functioning with respect to the entire object-surface by blending their zones, a motor carried by said apparatus to traverse the latter across said object-surface, means automatically to reverse said motor at the end of the said traversing movement, whereby the photographic apparatus is returned across said object-surface, and means to feed the sensitive surface of the apparatus past an exposure opening at the same rate as the forward traversing movement of said apparatus.

7. Photographic mechanism comprising in combination, a photographic apparatus having a lens, means to support said photographic apparatus for relative traversing movement with respect to a relatively large object-surface, means relatively to traverse said object-surface and said photographic apparatus, a motor carried by said apparatus to traverse the latter across said object-surface, means automatically to reverse said motor at the end of the said traversing movement, whereby the photographic apparatus is returned across said object-surface, and means for effecting exposure of the sensitive surface during the forward traversing movement of said apparatus.

8. Photographic mechanism comprising in combination, a photographic apparatus having a lens, means to support said photographic apparatus for relative traversing movement with respect to a relatively large object-surface, means relatively to traverse said object-surface and said photographic apparatus, a motor carried by said apparatus to traverse the latter across said object-surface, means automatically to reverse said motor at the end of the said traversing movement, whereby the photographic apparatus is returned across said object-surface, and means to feed the sensitive surface of the apparatus past an exposure opening at the same rate as the forward traversing movement of said apparatus.

9. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, said photographic apparatus including a closed receptacle containing the sensitive surface and feeding means for said sensitive surface protruding from within said receptacle, whereby it may be exteriorly operated to feed said sensitive surface, means relatively to traverse said object-surface and said photographic apparatus, and means for effecting exposure of the sensitive surface during said relative traversing movement.

10. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, said photographic apparatus including a closed receptacle containing the sensitive surface and feeding means for said sensitive surface protruding from within said receptacle, whereby it may be exteriorly operated to feed said sensitive surface, means to traverse said photographic apparatus across said object-surface, and means to feed the sensitive surface of the apparatus past an exposure opening at the same rate as the traversing movement of said apparatus.

11. Photographic mechanism comprising in combination, a first receptacle having therein a series or bank of lenses arranged in an aligned upright series with their major axes in parallelism, so that each lens functions with respect to a single transverse zone of the surface to be photographed, said lenses collectively functioning with respect to the entire object-surface by blending their said transversely extending zones, and a source of light and having an exposure opening, a second receptacle closed against tampering and adapted to be applied to the first receptacle and together therewith to constitute a photographic apparatus in light-communication, said second receptacle having therein means to support a sensitized film and said first receptacle having means to feed the film, said feeding means having a member protruding from the first receptacle, so as to be actuated, and means to traverse said entire photographic mechanism in a path in one direction past the object to be photographed.

12. Photographic mechanism comprising in combination, a first receptacle having therein a series or bank of lenses arranged in an aligned upright series with their major axes in parallelism, so that each lens functions with respect to a single transverse zone of the surface to be photographed, said lenses collectively functioning with respect to the entire object-surface by blending their said transversely extending zones, and a source of light and having an exposure opening, a second receptacle closed against tampering and adapted to be applied to the first receptacle and together therewith to constitute a photographic apparatus in light-communication, said second receptacle having therein means to support a sensitized film and said first receptacle having means to feed the film, said feeding means having a member protruding from the first receptacle so as to be actuated, said first receptacle having also therein a motor for traversing the entire photographic mechanism in a path in one direction past the object to be photographed.

13. Photographic mechanism comprising in combination, a first receptacle having therein a lens and a source of light and having an exposure opening, a second receptacle closed against tampering and adapted to be applied to the first receptacle and together therewith to constitute a photographic apparatus in light-communication, said second receptacle having therein means to support a sensitized film and said first receptacle having means to feed the film, said feeding means having a member protruding from the first receptacle so as to be actuated, said first receptacle having also therein a motor, and driving means for the receptacle connected to the motor and protruding from said first receptacle to engage a fixed track.

14. Photographic mechanism comprising in combination, a first receptacle having therein a lens and a source of light and having an exposure opening, a second receptacle closed against tampering and adapted to be applied to the first receptacle and together therewith to constitute a photographic apparatus in light-communication, said second receptacle having therein means to support a sensitized film and said first receptacle having means to feed the film, said feeding means having a member protruding from the first receptacle so as to be actuated, said first receptacle having also therein an electric motor and means for reversing the same protruding from the said receptacle to be actuated exteriorly.

15. Photographic mechanism comprising in combination, a first receptacle having therein a lens and a source of light and having an exposure opening, a second receptacle closed against tampering and adapted to be applied to the first receptacle and together therewith to constitute a photographic apparatus in light-communication, said second receptacle having therein means to support a sensitized film, and said first receptacle having an electric motor and electric circuit to feed the film and to traverse the entire photographic mechanism, and a set of readily removable and reinsertable circuit closing instrumentalities.

16. Photographic mechanism comprising in combination, a first receptacle having therein a lens and a source of light and having an exposure opening, a second receptacle closed against tampering and adapted to be applied to the first receptacle and together therewith to constitute a photographic apparatus in light-communication, said second receptacle having therein means to support a sensitized film, and said first receptacle having an electric motor and electric circuit to feed the film and to traverse the entire photographic mechanism, and a set of readily removable and reinsertable circuit closing instrumentalities and fixed means exterior to the photographic mechanism to participate in the traversing thereof.

17. Photographic mechanism comprising in combination a photographic apparatus having lens means, means to support said photographic apparatus for traversing movement in a straight path against or in close proximity to a large upright object-surface, means to traverse said photographic apparatus in said path across said surface, said lens means being so positioned and related to the object-surface as to photograph the entire surface during a single traversing movement of the apparatus in said path, means to support a sensitive film carried by said photographic apparatus and exposed to the object-surface throughout the said traversing movement, and means to feed said film at the same rate as the traversing movement of said apparatus whereby a large object-surface in close proximity is wholly photographed in one traversing movement.

18. In combination, photographic mechanism including a photographic apparatus having a lens, a voting machine having an upright surface whereon are the readings to be photographed, means upon said voting machine to support the said photographic apparatus in such manner that said apparatus may be traversed across said voting machine, means to traverse said apparatus across said voting machine, said apparatus having means to support a sensitive film to be exposed to said surface of the voting machine throughout said traversing movement, and means to feed said film at the same rate as said traversing movement.

19. In combination, a voting machine having a large upright surface where the readings are displayed, a track upon and arranged transversely of said voting machine and close to said surface, a photographic apparatus supported upon said track for movement directly across said face of the voting machine and in close proximity thereto, means for moving said photographic apparatus along said track, and means for making a continuous exposure of a sensitive surface during said traversing movement, said photographic apparatus having lens means so positioned and related to the said surface of the voting machine as to photograph the entire upright surface during a single passage of the photographic apparatus across the face of the said voting machine.

20. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, said photographic apparatus including a first receptacle having therein said bank or series of lenses and also including a second receptacle closed against tampering and adapted to be applied to said first receptacle so as together to constitute a photographic apparatus in light communication, said second receptacle having therein means to support a sensitized film, means to support said photographic apparatus in proximity to the said relatively large object-surface, means relatively to traverse said object-surface and said photographic apparatus, and means for effecting exposure of the sensitive surface during said relatively traversing movement.

21. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, said photographic apparatus including a first receptacle having therein said bank or series of lenses and also including a second receptacle closed against tampering and adapted to be applied to said first receptacle so as together to constitute a photographic apparatus in light communication, said second receptacle having therein means to support a sensitized film, means to support said photographic apparatus in close proximity to a relatively large object-surface, and means to traverse said photographic apparatus along said object-surface.

22. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, means carried by said apparatus to traverse said apparatus across said object-surface, means for reversing said traversing movement whereby the photographic apparatus is returned across the object-surface, and means for effecting exposure of the sensitive surface during travel of the apparatus in any direction.

23. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, means carried by said apparatus to traverse the same across the object-surface, means for returning said apparatus at the end of the said traversing movement, means for supporting a sensitized film, and means to feed said film during the traversing movement of the apparatus and at the same speed.

24. Photographic mechanism for photographing in a single traversing movement in a straight path a large object-surface in close proximity thereto comprising in combination, a first receptacle having therein lens provisions so arranged and related to said object-surface that in said single traversing movement the entire surface may be photographed, and having a source of light and an exposure opening, a second receptacle closed against tampering and adapted to be applied to the first receptacle and together therewith to constitute a photographic apparatus in light-communication, said second receptacle having therein means to support a sensitized film, and said first receptacle having an electric motor and electric circuit to feed the film and to traverse the entire photographic mechanism across the said object-surface in close established relation thereto in a straight path, whereby the entire object-surface is photographed in said single traverse in said path.

25. Mechanism for photographing a relatively large object-surface close to the sensitive surface of the photographic apparatus, comprising in combination, a photographic apparatus having a series or bank of lenses arranged in an aligned upright series with their major axes in parallelism so that each lens functions with respect to a single transverse zone of the surface to be photographed, said lenses collectively functioning with respect to the entire object-surface by blending their said transversely extending zones, a first receptacle receiving said bank or series of lenses and also having a source of light and an exposure opening, a second receptacle adapted to be applied to said first receptacle and together therewith constituting the photographic apparatus, said second receptacle having therein means to support a sensitized film, said first receptacle having means to feed said film and adapted to engage the support for the film in the second receptacle, said first receptacle having also therein a motor and driving means for the receptacle connected to the motor and protruding from said first receptacle to engage a fixed track.

26. Mechanism for photographing a relatively large object-surface relatively close to the sensitive surface of the photographic apparatus, including in combination a photographic apparatus having a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, and means relatively to traverse said object-surface and said photographic apparatus.

27. Mechanism for photographing a relatively large object-surface relatively close to the sensitive surface of the photographic apparatus, including in combination a photographic apparatus having a series or bank of lenses all with their axes in parallelism and so relatively positioned that the focal planes for all of said lenses constitute one single straight focal plane, and whereby each lens functions only with respect to a single transverse zone of the surface to be photographed, and each lens functions only with respect to a single transverse zone of the said single focal plane, and means relatively to traverse said object-surface and said photographic apparatus.

28. Mechanism for photographing a relatively large object-surface relatively close to the sensitive surface of the photographic apparatus, including in combination a photographic apparatus having a series or bank of lenses all with their axes in parallelism so that they are all directed at the same angle toward the said object-surface, whereby each lens functions only with respect to a single transverse zone of the surface to be photographed, and whereby said lenses collectively function with respect to the entire object-surface by blending their said zones, means relatively to traverse said object-surface and said photographic apparatus, and means for effecting exposure of the sensitive surface during said relative traversing movement.

29. Mechanism for photographing a relatively large object-surface relatively close to the sensitive surface of the photographic apparatus, including in combination a photographic apparatus having a series or bank of lenses all with their axes in parallelism and so relatively positioned that the focal planes for all of said lenses constitute one single straight focal plane, and whereby each lens functions only with respect to a single transverse zone of the surface to be photographed, and each lens functions only with respect to a single transverse zone of the said single focal plane, means relatively to traverse said object-surface and said photographic apparatus, and means for effecting exposure of the sensitive surface during said relative traversing movement.

30. Mechanism for photographing a relatively large object-surface relatively close to the sensitive surface of the photographic apparatus, including in combination a photographic apparatus having a series or bank of lenses one over another in an upright series and all with their axes in parallelism so that they are all directed at the same angle toward the said object-surface, whereby each lens functions only with respect to a single transverse zone of the surface to be photographed, and whereby said lenses collectively function with respect to the entire object-surface by blending their said zones, and means relatively to traverse said object-surface and said photographic apparatus.

31. Mechanism for photographing a relatively large object-surface relatively close to the sensitive surface of the photographic apparatus, including in combination a photographic apparatus having a series or bank of lenses one over another in an upright series and all with their axes in parallelism and so relatively positioned that the focal planes for all of said lenses constitute one single straight focal plane and whereby each lens functions only with respect to a single transverse zone of the surface to be photographed and each lens functions only with respect to a single transverse zone of said single focal plane, and means relatively to traverse said object-surface and said photographic apparatus.

32. Mechanism for photographing a relatively large object-surface relatively close to the sensitive surface of the photographic apparatus, including in combination a photographic apparatus having a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, means relatively to traverse said object-surface and said photographic apparatus, and means to support upon said photographic apparatus a single sensitive film to receive, on respectively adjoining zones thereof, images from said lenses respectively, whereby a single film receives the impression of the entire object-surface during said relative traversing movement.

33. Mechanism for photographing a relatively large object-surface relatively close to the sensitive surface of the photographic apparatus, including in combination a photographic apparatus having a series or bank of lenses all with their axes in parallelism and so relatively positioned that the focal planes for all of said lenses constitute one single straight focal plane, and whereby each lens functions only with respect to a single transverse zone of the surface to be photographed, and each lens functions only with respect to a single transverse zone of the said single focal plane, means relatively to traverse said object-surface and said photographic apparatus, and means to support upon said photographic apparatus a single sensitive film to receive, on respectively adjoining zones thereof, images from said lenses respectively, whereby a single film receives the impression of the entire object-surface during said relative traversing movement.

34. Mechanism for photographing a relatively large object-surface relatively close to the sensitive surface of the photographic apparatus, including in combination a photographic apparatus having a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, means relatively to traverse said object-surface and said photographic apparatus, means to support upon said photographic apparatus a single sensitive film to receive, on respectively adjoining zones thereof, images from said lenses respectively, whereby a single film receives the impression of the entire object-surface during said relative traversing movement, and means to move said single film at the same rate as said traversing movement, whereby a picture is uninterruptedly taken of the object-surface during said traversing movement.

35. Mechanism for photographing a relatively large object-surface relatively close to the sensitive surface of the photographic apparatus, including in combination a photographic apparatus having a series or bank of lenses all with their axes in parallelism and so relatively positioned that the focal planes for all of said lenses constitute one single straight focal plane, and whereby each lens functions only with respect to a single transverse zone of the surface to be photographed, and each lens functions only with respect to a single transverse zone of the said single focal plane, means relatively to traverse said object-surface and said photographic apparatus, means to support upon said photographic apparatus a single sensitive film to receive, on respectively adjoining zones thereof, images from said lenses respectively, whereby a single film receives the impression of the entire object-surface during said relative traversing movement, and means to move said single film at the same rate as said traversing movement, whereby a picture is uninterruptedly taken of the object-surface during said traversing movement.

36. Mechanism for photographing a relatively large object-surface relatively close to the sensitive surface of the photographic apparatus, including in combination a photographic apparatus having a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, and a motor carried by said apparatus to traverse the latter across said object-surface.

37. Mechanism for photographing a relatively large object-surface relatively close to the sensitive surface of the photographic apparatus, including in combination a photographic apparatus having a series or bank of lenses all with their axes in parallelism and so relatively positioned that the focal planes for all of said lenses constitute one single straight focal plane, and whereby each lens functions only with respect to a single transverse zone of the surface to be photographed, and each lens functions only with respect to a single transverse zone of the said single focal plane, and a motor carried by said apparatus to traverse the latter across said object-surface.

38. Mechanism for photographing a relatively large object-surface relatively close to the sensitive surface of the photographic apparatus, including in combination a photographic apparatus having a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, a motor carried by said apparatus to traverse the latter across said object-surface, and means to reverse the direction of said traversing movement so as to return the parts to their initial position.

39. Mechanism for photographing a relatively large object-surface relatively close to the sensitive surface of the photographic apparatus, including in combination a photographic apparatus having a series or bank of lenses all with their axes in parallelism and so relatively positioned that the focal planes for all of said lenses constitute one single straight focal plane, and whereby each lens functions only with respect to a single transverse zone of the surface to be photographed, and each lens functions only with respect to a single transverse zone of the said single focal plane, a motor carried by said apparatus to traverse the latter across said object-surface, and means to reverse the direction of said traversing movement so as to return the parts to their initial position.

40. That method of photographing upon a single sensitive surface a relatively large object-surface close thereto which comprises arranging a series or bank of lenses all with their axes in parallelism one over another in upright series so that they are all directed at the same angle toward the said object-surface, and whereby each lens functions only with respect to a single transverse zone of said surface to be photographed; providing a single sensitive surface with different transverse zones whereof said lenses respectively function; relatively traversing said object-surface and said series of lenses while close to each other; feeding said sensitive surface at the same rate of speed; and exposing said sensitive surface during said feeding and said relative traversing movement of the series of lenses and said object-surface.

41. That method of photographing upon a single sensitive surface, a relatively large object-surface close thereto which comprises arranging a series or bank of lenses all with their axes in parallelism one over another in upright series so that they are all directed at the same angle toward the said object-surface, and whereby each lens functions only with respect to a single transverse zone of said surface to be photographed; providing a single sensitive surface with different transverse zones whereof said lenses respectively function; moving said photographing apparatus across the object-surface in a direction transverse to a plane drawn through all of said lenses; feeding said sensitive surface at the same rate of speed; and exposing said sensitive surface during said feeding and said traversing movement of the photographing apparatus.

42. That method of photographing upon a single sensitive surface a relatively large object-surface close thereto which comprises arranging a series or bank of lenses all with their axes in parallelism one over another in upright series so that they are all directed at the same angle toward the said object-surface, and whereby each lens functions only with respect to a single transverse zone of said surface to be photographed; providing a single sensitive surface with different transverse zones whereof said lenses respectively function; moving the photographing apparatus horizontally across the object-surface while maintaining said object-surface and said apparatus close to each other; feeding said sensitive surface at the same rate of speed as said horizontal movement of the photographing apparatus; and exposing said sensitive surface during said feeding movement and said horizontal movement of the photographing apparatus.

43. Mechanism for photographing a relatively large object-surface relatively close to the sensitive surface of the photographic apparatus, including in combination a photographic apparatus having supported thereon in fixed relation to each other a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, and means relatively to traverse said object-surface and said photographic apparatus.

44. Mechanism for photographing a relatively large object-surface relatively close to the sensitive surface of the photographic apparatus, including in combination a photographic apparatus having a series or bank of lenses all with their axes in parallelism, so that they are all directed at the same angle toward the said object-surface, whereby each lens functions only with respect to a single transverse zone of the surface to be photographed, and whereby said lenses collectively function with respect to the entire object-surface by blending their said zones, a motor carried by said photographic apparatus to traverse said apparatus across said sensitive surface, and means to reverse said motor at the end of said traversing movement, and means to expose the said surface during the forward direction of travel of said apparatus.

45. Mechanism for photographing a relatively large object-surface relatively close to the sensitive surface of the photographic apparatus, including in combination a photographic apparatus having a series or bank of lenses arranged one over another in upright series, and all with their axes in parallelism, so that they are all directed at the same angle toward the said object-surface, whereby each lens functions only with respect to a single transverse zone of the surface to be photographed and whereby said lenses collectively function with respect to the entire object-surface by blending their said zones, said photographic apparatus including a closed receptacle containing the sensitive surface and feeding means for said sensitive surface protruding from within said receptacle, whereby it may be exteriorly operated to feed said sensitive surface, and means relatively to traverse said object-surface and said photographic apparatus, and means for effecting exposure of the sensitive surface during said relative traversing movement.

46. Mechanism for photographing a relatively large object-surface relatively close to the sensitive surface of the photographic apparatus, including in combination a photographic apparatus having a series or bank of lenses arranged one over another in upright series, and all with their axes in parallelism, so that they are all directed at the same angle toward the said object-surface, whereby each lens functions only with respect to a single transverse zone of the surface to be photographed and whereby said lenses collectively function with respect to the entire object-surface by blending their said zones; a first receptacle containing said series of lenses and a source of light and having an exposure opening, a second receptacle closed against tampering and adapted to be applied to the first receptacle and together therewith to constitute a photographic apparatus in light-communication, said second receptacle having therein means to support a sensitized film and said first receptacle having means to feed the film, said feeding means having a member protruding from the first receptacle so as to be actuated, and means to traverse said entire photographic mechanism past the object to be photographed.

WILLIAM H. PETIT.
EDSON S. HINELINE.